Figure 1:
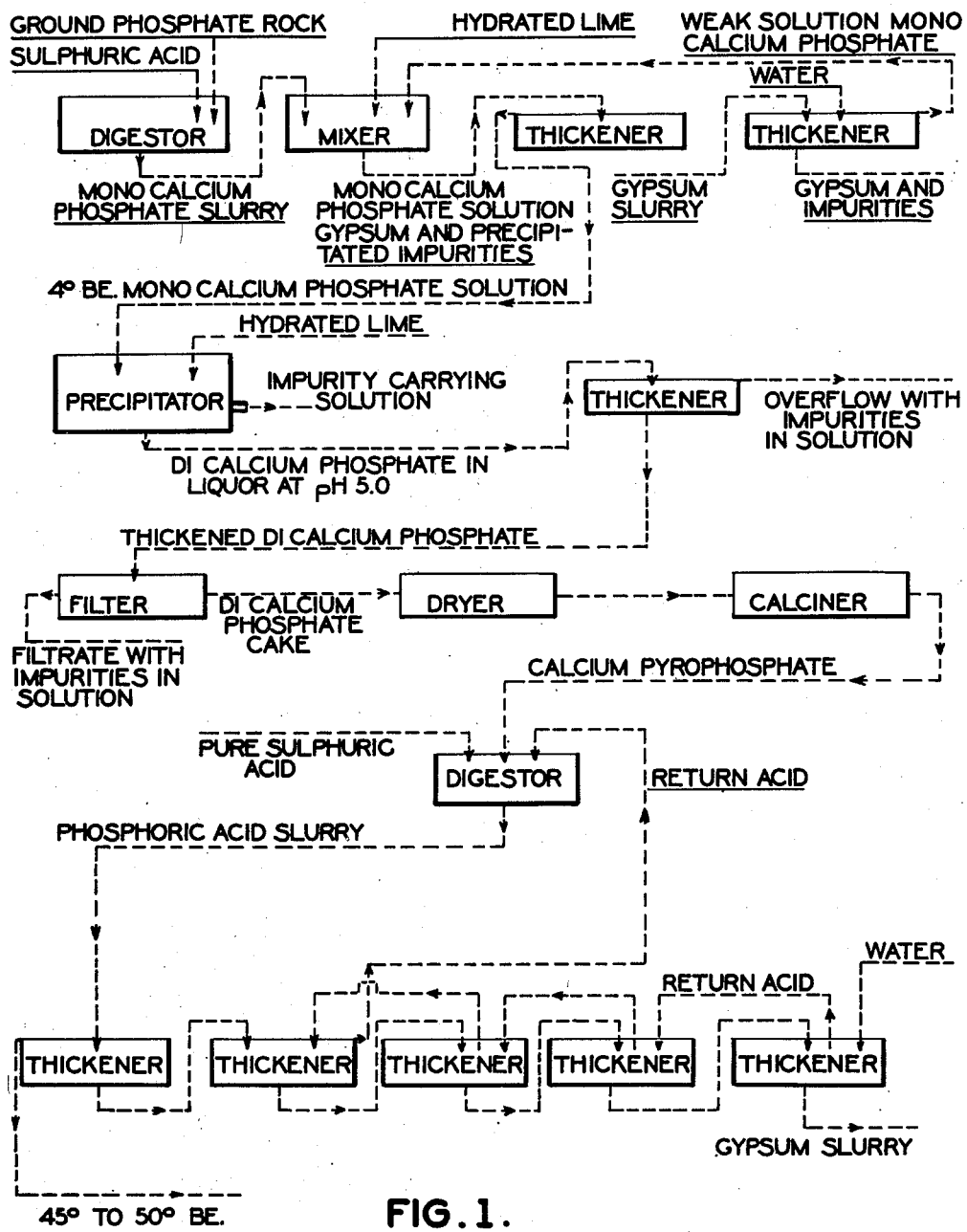

Sept. 10, 1935. G. F. MOORE 2,013,970
PROCESS OF PRODUCING PHOSPHORIC ACID AND DERIVATIVES OF THE SAME
Filed Feb. 10, 1933 2 Sheets-Sheet 2

INVENTOR
GEORGE F. MOORE
BY Noquet & Neary
ATTORNEY

Patented Sept. 10, 1935

2,013,970

UNITED STATES PATENT OFFICE 2,013,970

PROCESS OF PRODUCING PHOSPHORIC ACID AND DERIVATIVES OF THE SAME

George F. Moore, Tampa, Fla., assignor to U. S. Phosphoric Products Corporation, New York, N. Y., a corporation of Delaware Application February 10, 1933, Serial No. 656,146

20 Claims. (Cl. 23—165)

This invention relates to improvements in processes for the preparation of pure phosphorus-containing compounds. More particularly, the invention is concerned with the treatment of phosphate rock and similar phosphatic materials with sulphuric acid for the production of phosphorus-containing compounds, such as ortho-phosphoric acid and derivatives of the same of a high degree of purity.

The present industrial practice for the production of phosphoric acid by the sulphuric acid process involves certain difficulties, both in the purification operations necessary to produce a product of commercial value and in the separations of the acid from the insoluble residues and precipitates produced in the process. According to the present practice the raw material, previously ground to a suitable degree of fineness, is treated with sufficient dilute sulphuric acid to convert all the phosphorus content directly to free phosphoric acid. Usually the reaction is not quite complete and the product contains a small percentage of mono-calcium phosphate. The crude phosphoric acid is then separated from the insoluble residues and precipitates,—principally silica and calcium sulphate—the usual means being either decantation or filtration. The crude acid will at this stage contain in solution considerable amounts of iron, aluminum and fluoride compounds, more or less manganese and magnesium, usually a small amount of arsenic, and a small but nevertheless noticeable amount of suspended or dissolved calcium sulphate. The crude phosphoric acid will also contain more or less organic matter depending upon the nature and source of the raw material. These impurities are objectionable not only from the standpoint that they adulterate the acid product but also from the standpoint that certain of them are deleterious to health and must be removed before the acid can be used in preparing food products. Others impart color which lowers the saleability of the product. It is the practice to subject the crude acid, after it is separated from the residues and precipitates resulting from the initial acidification treatment, to a series of purification steps having for their aim to eliminate certain of the impurities mentioned and to reduce others to an acceptable tolerance. These operations as heretofore conducted involve considerable more or less time-consuming manipulation. At the same time, because of certain inherent limitations in the process as heretofore practised, the purification, particularly as respects elimination of such impurities as iron, aluminum and magnesium, has been far from complete and as a consequence phosphoric acid produced by the so-called volatilization process has been displacing the product of the sulphuric acid process for use in preparing food products and in other situations where a water-white product of high purity is demanded.

As the sulphuric acid process has heretofore been practised it is necessary to resort to a prolonged concentrating operation, usually after the purification operations have been completed, to bring the acid to the required concentration. This concentrating operation adds to the cost and unless carefully conducted may detract from the quality of the product.

As disclosed in my co-pending application Serial No. 475,389, filed August 14, 1930, of which this application is a continuation in part, I have found that, if the treatment of phosphatic materials with sulphuric acid is carried out in several separate progressive stages according to the process of my invention, the production of phosphoric acid or its derivatives is greatly simplified as regards the time and manipulation necessary to complete the operations and is attended by considerable enhancement of the purity of the ultimate product. The present invention includes certain additional features of control having for an object a still greater improvement in the quality of the final product, particularly as respects elimination of magnesium, manganese and similar impurities. The present invention also includes in a modified form of my process above mentioned an improved method of eliminating organic matter with the simultaneous conversion of the phosphate content of the material under treatment into a form in which it may be transformed to ortho-phosphoric acid of a high degree of concentration without resorting to special concentrating operations.

Instead of treating the raw material, as for example phosphate rock, with sufficient sulphuric acid to convert the tri-calcium phosphate content of the rock directly to phosphoric acid, I subject the raw material to the action of sufficient sulphuric acid to convert the tri-calcium phosphate to the mono-calcium form but insufficient to convert more than a minor portion to free phosphoric acid. This compound is sufficiently soluble in water to permit of its being brought into dilute solution. I have found that by carrying on certain of the purifying steps with the phosphorus content of the material under treatment in the form of a dilute solution of the mono-calcium phosphate it is possible to greatly improve the efficiency of the separation of the impurities; so much so as to make it practicable to treat phosphatic materials that heretofore would have been discarded because of the high percentage of mineral impurities, such for example as iron, aluminum magnesium and manganese. In subsequent operations I concentrate the mono-calcium sa.. to the water insoluble di-calcium form, and by treating this compound, either directly or after a further treatment as hereinafter described, with concentrated sulphuric acid I am enabled to obtain in a relatively concentrated solution ortho-phosphoric acid of a high degree of purity.

In addition to the above-mentioned advantages that accrue from my process, there is the further advantage that a larger proportion of the gypsum formed in the conversion of the phosphatic material is recovered in a high state of purity; in fact, approximately two units may be so recovered in my process to every unit so recoverable in the process as heretofore practised. This pure gypsum is of considerable commercial value in certain industrial processes, as for example, the manufacture of fine finish plaster.

Figure 2:
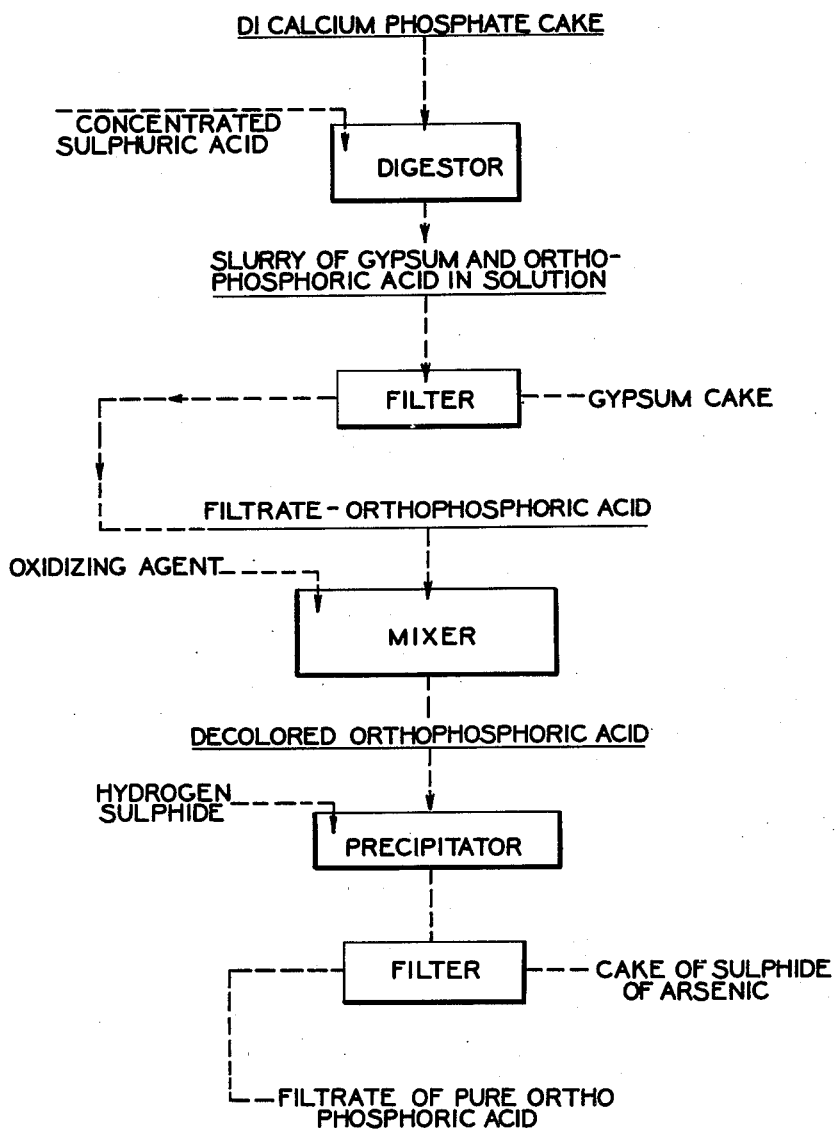

In the drawing, Fig. 1 is a flow sheet illustrative of that form of the process involving steps described more fully hereinafter as Nos 1, 2, 3, 4, 5, 6b, 7b, 8b, and 9b; and Fig. 2 is a flow sheet illustrative of that part of the modified form of the process involving the substitution for steps 6b–9b, inclusive, of steps described more fully hereinafter as steps Nos. 6a–9a, inclusive.

The process of my invention in its broader aspects may be considered to comprise in combination a series of progressive operations or steps involving the successive conversion of the original phosphatic material to mono-calcium phosphate, di-calcium phosphate, and finally pure ortho-phosphoric acid. In the following outline, the essential steps of the process are indicated. It is to be understood, however, that a certain degree of modification in respect of detail of operation and order of occurrence of the several steps is possible without deviating from the spirit of my invention.

1. A phosphatic material, as for example comminuted phosphate rock, is subjected to the action of sufficient sulphuric acid to form water soluble mono-calcium phosphate but insufficient to form more than a minor proportion of free phosphoric acid.

2. The reaction mixture produced as above described is diluted with water and neutralized with a suitable neutralizing agent, such as calcium carbonate or hydrated lime, to such a degree as to insure the complete precipitation of the iron, aluminum and fluorides in an easily separable state.

3. The relatively pure solution of mono-calcium phosphate from 2 is separated from the insoluble residues and precipitates in a suitable manner, as by decantation and filtration.

4. The mono-calcium phosphate solution is treated with lime to convert the salt to the water insoluble di-calcium form while controlling the acidity of the solution so as to insure the retention in solution of mineral impurities that were not precipitated in the second step, such for example as magnesium and manganese salts.

5. Separation of the precipitated di-calcium phosphate from the solution and from any impurities dissolved or suspended therein by decantation and filtration.

The solid di-calcium phosphate thus obtained is converted, either directly or indirectly as hereinafter more particularly described, to ortho-phosphoric acid. If converted directly to ortho-phosphoric acid, the succeeding steps of the process will be as follows:

6a. The solid di-calcium phosphate, either in the dry form or as a wet cake, is subjected to the action of sufficient concentrated sulphuric acid to convert the phosphate to ortho-phosporic acid.

7a. The solution of phosphoric acid so obtained is separated from the precipitated gypsum by decantation and filtration.

8a. The phosphoric acid solution is decolorized by subjecting it to the action of a suitable oxidizing agent.

9a. The decolorized phosproric acid solution is subjected to the action of hydrogen sulphide to insure the complete removal of any arsenic that may be present in the event the phosphoric acid is to be used in the preparation of food products.

Instead of converting the di-calcium phosphate directly to ortho-phosphoric acid as described above, the following modified procedure may be advantageously adopted.

6b. The solid di-calcium phosphate from 5 is dried and calcined until all of the organic color-imparting impurities are burned off leaving pure calcium pyro-phosphate.

7b. The calcium pyro-phosphate is digested with sulphuric acid, preferably at least moderately strong acid, to form ortho-phosphoric acid.

8b. The relatively concentrated solution of ortho-phosphoric acid thus produced is separated from the precipitated gypsum by decantation and filtration.

9b. In the event the phosphoric acid from 8b is to be used in the preparation of food products, it is subjected to the action of hydrogen sulphide to remove any arsenic that may be present.

The second modification of the process which is immediately hereinbefore described has the advantage that it affords a method of completely eliminating organic color-imparting impurities even when such impurities are present in relatively large amounts and at the same time permits of the production directly without further concentration of a final ortho-phosphoric acid product of a strength meeting commercial requirements; that is to say, of a strength up to around 50° Bé.

It is to be understood that the order of certain of the operations above mentioned permits of some variance, and that the invention also contemplates the modification of the process by the addition of certain collateral steps or operations, logically concerned with the operation of the process as a whole. These modifications and ramifications of the process embodying my invention will be more fully apparent in the further detailed exposition of the same hereinafter set forth.

It is to be noted that a great advantage of my process over the present practice lies in the removal of substantially all of the impurities present in the raw materials by simple separations at various stages of the process before final conversion of the phosphatic material to ortho-phosphoric acid. Under the present practice the treatment for removal of impurities present in the raw materials takes place after the phosphate has been converted to the form of crude acid and in the presence of relatively strongly acid solutions. Due to the multi-stage character of my process, the problems of purification and concentration are greatly simplified, both as to the efficiency and the operating difficulty of the various manipulations. Thus it will be seen that my invention considerably facilitates and expedites the conversion of natural or artificial phosphatic materials to ortho-phosphoric acid by sulphuric acid treatment. Further advantages lie in the nature of the several solutions, the majority of which are weakly acid or nearly neutral, thus enabling better separation of precipitates and insoluble residues, higher percentage recovery of the phosphate content of the material treated, minimized concentrating of the ultimate product, simplified chemical control and adaptability to the treatment of low grade phosphate rock high in silica, iron, aluminum, magnesium, manganese and organic impurities.

In adapting the process of my invention to the production of pure ortho-phosphoric acid from a phosphatic material, such as pebble phosphate or phosphate rock, the following procedure may be advantageously carried out. The phosphate rock in comminuted form is subjected to the action of sulphuric acid in sufficient amount to convert the tri-calcium phosphate content of the raw material substantially completely to the mono-calcium phosphate form but insufficient to convert more than a minor proportion to free phosphoric acid. The sulphuric acid may be of any desired strength, but I have found that very beneficial results are obtained with relatively concentrated (53° Bé.–55° Bé.) acid. The reaction mixture may advantageously be heated during operation to a temperature of approximately 170° F. The resulting mixture, after reaction has taken place, will contain a small percentage of free phosphoric acid, which may be conveniently converted to mono-calcium phosphate by neutralizing with fine calcium carbonate or hydrated lime.

Control of the degree of neutralization is important at this point because of its influence on the completeness of the precipitation of the impurities removable at this stage, particularly iron, aluminum and fluorides. According to the practice heretofore followed in carrying out the sulphuric acid process, the solution brought to this neutralization step will, as hereinbefore indicated, consist principally of phosphoric acid. It has been customary to carry the neutralization of this solution to the point where the resulting mono-calcium phosphate solution would contain approximately 4 to 4.5% of free phosphoric acid. While the bulk of iron, aluminum and similar impurities is precipitated as a result of this treatment, the precipitation is far from complete and a small but nevertheless substantial amount of these impurities remains even when the phosphatic material under treatment is of relatively high grade. With relatively low grade materials the percentage of these impurities that would be left would be much greater. It has not been considered practical to carry the neutralization further because this would require the use of much more dilute solutions, which, as the process has been practised, would later need to be concentrated by heating. Furthermore, it does not appear to have been appreciated that if the neutralization were carried further, these impurities would be more completely eliminated and their separation facilitated. I have found that if the neutralization is carried further to, say, a point where no free phosphoric acid is present in the mono-calcium phosphate solution produced, the iron, aluminum and fluoride impurities are substantially completely precipitated even when the raw material is of low grade and originally contains a high percentage content of such impurities. At the same time the precipitates formed are much more readily separable by settling or filtering methods. The complete neutralization of the free phosphoric acid is indicated when the solution shows a pH value of approximately 4.4, or, what is the same thing, when the neutral point as measured by methyl orange has been reached. The solution will, of course, still show considerable phenolphthalein acidity. In some cases, as for example when working with raw materials of reasonably high grade such as have heretofore been considered essential for the production of a reasonably satisfactory product by the sulphuric acid process as heretofore practised or when it is permissible that the ultimate product may carry a small percentage of impurities, the advantages of the present invention may be obtained to a very considerable degree by operating with a very slight acidity, say, not exceeding around 1% of the total $P_2O_5$ content of the solution. This is a much lower acidity than would be practicable with the sulphuric acid process as heretofore practised, but is rendered practicable in my process because of my novel method of recovering the phosphate in concentrated solution and getting rid of water. Even when this expansion of the permissible range of operations is availed of the product shows a marked improvement as regards freedom from impurities as compared with the products produced in the old process from similar raw materials.

The mixture either before or after the neutralizing step is diluted with water in order to obtain, in aqueous solution, substantially all of the soluble phosphate present, and further to insure complete precipitation, in an easily separable form of the iron, aluminum and fluorides present. The insoluble residues and precipitates are advantageously separated from the solution of mono-calcium phosphate by decantation and filtration, followed by washing of the residual solids with water to leach out any soluble phosphate contained therein. Complete recovery of the water soluble phosphate present is possible, inasmuch as the concentration of the solution of mono-calcium phosphate is not a factor for consideration in this process.

The dilute solution of mono-calcium phosphate, substantially free from iron, aluminum and fluorides, is next treated with pure lime to convert the phosphate to the insoluble di-calcium salt. I have found that it is important at this stage to add insufficient lime to completely precipitate all of the phosphate. This is done to keep the magnesium, manganese and similar impurities from precipitating out in admixture with the di-calcium phosphate. I have found that if the lime additions are so controlled as to keep the pH value from substantially exceeding about 5.4, and preferably within the range 5.0 to 5.4, the magnesium, manganese and similar impurities present will be retained in solution and that the resulting di-calcium phosphate may be recovered free from all but minute traces of all impurities except organic matter. Most of the water, together with the impurities dissolved or suspended therein, is removed by settling and decantation, after which the di-calcium phosphate is washed and completely de-watered by filtration.

By controlling the neutralization in the manner above stated there will be a small loss of the $P_2O_5$ to the process, this $P_2O_5$ being in solution as phosphates of magnesium, manganese, etc., and some mono-calcium phosphate. This P₂O₅ may be recovered from the decanted liquids by adding more lime. The precipitates so formed will have value for fertilizer purposes.

If the phosphatic material under treatment does not contain an abnormal proportion of organic matter, the di-calcium phosphate produced as above may be converted directly to ortho-phosphoric acid by treating with sufficient sulphuric acid to convert the phosphate to ortho-phosphoric acid. While any desired strength of sulphuric acid may be used in this treatment, I have found it advisable to utilize very concentrated acid (66° Bé. or higher) in order to minimize subsequent concentrating of the product. This operation is attended with the formation of very pure snow white gypsum, which precipitates during the sulphuric acid treatment. The phosphoric acid is leached out as closely as possible with previously prepared 25° to 30° Bé. phosphoric acid, effecting the final separation of the phosphoric acid solution from the gypsum by decantation and filtration. The insoluble residue remaining on the filter is washed with water to extract any entrained phosphoric acid.

The concentrated phosphoric acid solution obtained as indicated in the preceding paragraph, may be next subjected to an oxidizing treatment for the purpose of decolorizing. Any suitable decolorizing agent, as for example potassium or sodium chlorate, potassium permanganate or chlorine, may be used. If the phosphoric acid is to be used in the preparation of food products, it is necessary to subject the decolorized solution to the usual hydrogen sulphide treatment for the removal of arsenic, after which the solution may be further concentrated to any desired strength in any suitable manner, as for example, by evaporation. This final concentrating operation occasions the preciptation of final traces of calcium sulphate and the decanted solution of concentrated phosphoric acid is thus substantially completely free from impurities.

Although direct conversion of the di-calcium phosphate to ortho-phosphoric acid is practicable and may be recommended when the raw materials available are of relatively high grade and it is not desired to modify too drastically the existing plant facilities, I prefer to introduce at this point in the process a calcination treatment of the di-calcium phosphate. According to this modification of the process, the di-calcium phosphate after it has been washed is calcined until all of the organic matter is burned off. The product will then have a pure white color. A calcination treatment carried on at around 800 to 1000° C. for a period of from 20 to 30 minutes will usually suffice to accomplish this purpose. The product of this treatment is pure pyro-calcium phosphate analyzing around 55% P₂O₅. This may be converted to ortho-phosphoric acid of from 45° Bé. to 50° Bé. by treatment with strong sulphuric acid. The reactions on acidulation are:

$$Ca_2P_2O_7 + 2H_2SO_4 \rightarrow 2CaSO_4 + H_4P_2O_7$$
$$H_4P_2O_7 + H_2O \rightarrow 2H_3PO_4$$

The conversion of the pyro-phosphate may be effected with weaker sulphuric acid, but in this case further concentration will be required if a phosphoric acid product of the Beaumé strengths above mentioned is required.

The phosphoric acid product of the treatment, after separation from the gypsum produced as above, may be purified from arsenic in the known manner, whereupon it is ready for sale without further treatment.

Instead of carrying on the treatment to remove arsenic at the point in the process where the phosphate has been finally converted to phosphoric acid, the arsenic impurity may be removed by suitably treating the dilute solution of mono-calcium phosphate obtained in the first stage of the process as outlined above.

If it is desired to obtain relatively pure di-calcium phosphate in concentrated form, the process as outlined in the early pages of this specification may be carried out as far as the operation resulting in the precipitation of di-calcium phosphate from a dilute solution of mono-calcium phosphate. The product obtained at this point is of sufficient purity to be adaptable for any commercial use aside from the manufacture of food products. It may, for example, be utilized either alone or in combination with other desired compounds, as a fertilizer, being undiluted with calcium sulphate or other compounds which would detract from its value in this connection.

Still another ramification of my process consists in utilizing the pure phosphoric acid produced as indicated heretofore, for the production of commercially valuable calcium derivatives by treating said acid with pure calcium carbonate or lime in sufficient amount to produce in a high state of purity, either mono-, di-, tri-calcium phosphate as desired.

The process of my invention is adaptable to the treatment of both high and low grade phosphate rocks, as well as any other natural or artificial phosphatic materials from which it is desired to produce pure ortho-phosphoric acid or its derivatives. Whenever the term "phosphatic materials" occurs throughout the specification and claims, it is to be considered to embrace any phosphate compounds susceptible to the action of sulphuric acid.

I claim:

1. The process of preparing substantially pure ortho-phosphoric acid, which comprises subjecting tri-calcium phosphate-containing material to the action of sulphuric acid in such amount and of such strength as to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with lime to precipitate the phosphate as di-calcium phosphate, separating the insoluble di-calcium phosphate from the remaining solution and the impurities dissolved or suspended therein, and converting the di-calcium phosphate thus obtained to ortho-phosphoric acid.

2. The process of preparing substantially pure ortho-phosporic acid, which comprises subjecting tri-calcium phosphate-containing material to the action of sulphuric acid in such amount and of such strength as to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with lime to precipitate the phosphate as di-calcium phosphate, separating the insoluble di-calcium phosphate from the remaining solution and the impurities dissolved or suspended therein, and subjecting the di-calcium phosphate thus obtained to the action of sulphuric acid to convert the insoluble phosphate to ortho-phosphoric acid.

3. The process of preparing substantially pure ortho-phosphoric acid, which comprises subjecting tri-calcium phosphate-containing material to the action of sulphuric acid in such amount and of such strength as to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with lime to precipitate the phosphate as di-calcium phosphate, separating the insoluble di-calcium phosphate from the remaining solution and the impurities dissolved or suspended therein, calcining the di-calcium phosphate to remove organic impurities and to convert said di-calcium phosphate to calcium pyro-phosphate, and finally converting the calcium pyro-phosphate to ortho-phosphoric acid.

4. The process of preparing substantially pure ortho-phosphoric acid, which comprises subjecting tri-calcium phosphate-containing material to the action of sulphuric acid in such amount and of such strength as to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with sufficient lime to reduce the acidity thereof to a pH value within the range 5.0 to 5.4 and to precipitate nearly all of the phosphate as di-calcium phosphate, separating the insoluble di-calcium phosphate from the remaining solution and the impurities dissolved or suspended therein, and converting the di-calcium phosphate thus obtained to ortho-phosphoric acid.

5. The process of preparing substantially pure ortho-phosphoric acid, which comprises subjecting tri-calcium phosphate-containing material to the action of sulphuric acid in such amount and of such strength as to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with sufficient lime to reduce the acidity thereof to a pH value within the range 5.0 to 5.4 and to precipitate nearly all of the phosphate as di-calcium phosphate, separating the insoluble di-calcium phosphate from the remaining solution and the impurities dissolved or suspended therein, and subjecting the di-calcium phosphate to the action of sulphuric acid to convert the insoluble phosphate to ortho-phosphoric acid.

6. The process of preparing substantially pure ortho-phosphoric acid, which comprises subjecting tri-calcium phosphate-containing material to the action of sulphuric acid in such amount and of such strength as to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with sufficient lime to reduce the acidity thereof to a pH value within the range 5.0 to 5.4 and to precipitate nearly all of the phosphate as di-calcium phosphate, separating the insoluble di-calcium phosphate from the remaining solution and the impurities dissolved or suspended therein, calcining the di-calcium phosphate to remove organic impurities and to convert said di-calcium phosphate to calcium pyro-phosphate, and finally converting the calcium pyro-phosphate to ortho-phosphoric acid.

7. The process of preparing substantially pure ortho-phosphoric acid, which comprises subjecting comminuted phosphate rock to the action of sufficient relatively concentrated sulphuric acid to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with lime to reduce the acidity thereof to a pH value within the range 5.0–5.4 and to precipitate nearly all of the phosphate as di-calcium phosphate, separating the insoluble di-calcium phosphate from the remaining solution and the impurities dissolved or suspended therein, and converting the di-calcium phosphate thus obtained to ortho-phosphoric acid.

8. The process of preparing substantially pure ortho-phosphoric acid, which comprises subjecting comminuted phosphate rock to the action of sufficient relatively concentrated sulphuric acid to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with lime to reduce the acidity thereof to a pH value within the range 5.0–5.4 and to precipitate nearly all of the phosphate as di-calcium phosphate, separating the insoluble di-calcium phosphate from the remaining solution and the impurities dissolved or suspended therein, and subjecting the di-calcium phosphate thus obtained to the action of 66° Bé. or stronger sulphuric acid to convert the insoluble phosphate to ortho-phosphoric acid.

9. The process of preparing substantially pure ortho-phosphoric acid, which comprises subjecting comminuted phosphate rock to the action of sufficient relatively concentrated sulphuric acid to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with lime to reduce the acidity thereof to a pH value within the range 5.0–5.4 and to precipitate nearly all of the phosphate as di-calcium phosphate, separating the insoluble di-calcium phosphate from the remaining solution and the impurities dissolved or suspended therein, calcining the di-calcium phosphate to remove organic impurities and to convert said di-calcium phosphate to calcium pyro-phosphate and treating such pyro-phosphate with strong sulphuric acid to form relatively concentrated ortho-phosphoric acid.

10. The process of preparing substantially pure ortho-phosphoric acid, which comprises heating comminuted phosphate rock at a temperature of approximately 170° F. in the presence of sufficient 53–55° Bé. sulphuric acid to convert the tri-calcium phosphate substantially completely to mono-calcium phosphate but insufficient to convert more than a minor portion thereof to free phosphoric acid, adding sufficient neutralizing agent to reduce the acidity of the mixture to at least a pH value of 4.4, separating the mono-calcium phosphate in the form of a dilute aqueous solution from the insoluble residues and precipitates, treating said solution with lime to precipitate the phosphate as di-calcium phosphate, separating the insoluble di-calcium phosphate from the remaining solution and the impurities dissolved or suspended therein, and subjecting the di-calcium phosphate thus obtained to the action of 66° Bé. or stronger sulphuric acid to convert the insoluble phosphate to ortho-phosphoric acid.

11. The process of preparing substantially pure ortho-phosphoric acid which comprises subjecting comminuted phosphate rock to the action of sufficient 53–55° Bé. sulphuric acid to convert the phosphate content of the rock substantially completely to mono-calcium phosphate, diluting the mixture, neutralizing said mixture with lime to a pH value of approximately 4.4, separating the insoluble residues and precipitates from the solution of mono-calcium phosphate, washing the residual solids with water, adding the wash waters to the mono-calcium phosphate solution, treating the dilute solution of mono-calcium phosphate thus obtained with lime, separating the precipitated di-calcium phosphate from the water and the impurities dissolved or suspended therein, washing said precipitate, treating said precipitate with 66° Bé. or stronger sulphuric acid to convert the phosphate to ortho-phosphoric acid, separating the precipitated gypsum from the solution of phosphoric acid, decolorizing said solution by treatment with a suitable oxidizing agent, subjecting said solution to the action of hydrogen sulphide for the removal of arsenic, and finally concentrating the resulting solution of pure ortho-phosphoric acid to the desired strength.

12. In a process of preparing substantially pure phosphorus-containing compounds from impure phosphatic materials, the steps which comprise subjecting such an impure phosphatic material to the action of sulphuric acid in such amount and of such strength as to convert the phosphate content of such material substantially completely to mono-calcium phosphate but insufficient to convert more than a minor portion thereof to free phosphoric acid, adding sufficient neutralizing agent to reduce the acidity of the mixture to at least a pH value of 4.4 thereby occasioning the precipitation in an easily separable state of iron, aluminum and fluoride impurities, separating the mono-calcium phosphate in the form of a dilute aqueous solution from the insoluble residues and precipitates, treating said solution with lime to reduce the acidity thereof to a pH value within the range 5.0–5.4 and to precipitate nearly all of the phosphate as di-calcium phosphate, and separating the insoluble di-calcium phosphate from the remaining solution and the impurities dissolved or suspended therein.

13. In a process of preparing substantially pure phosphorus-containing compounds from impure phosphatic materials, the steps which comprise subjecting such an impure phosphatic material to the action of sulphuric acid in such amount and of such strength as to convert the phosphate content of such material substantially completely to mono-calcium phosphate but insufficient to convert more than a minor portion thereof to free phosphoric acid, adding sufficient neutralizing agent to reduce the acidity of the mixture to at least a pH value of 4.4 thereby occasioning the precipitation in an easily separable state of iron, aluminum and fluoride impurities, separating the mono-calcium phosphate in the form of a dilute aqueous solution from the insoluble residues and precipitates, treating said solution with lime to reduce the acidity thereof to a pH value within the range 5.0–5.4 and to precipitate nearly all of the phosphate as di-calcium phosphate, separating the insoluble di-calcium phosphate from the remaining solution and the impurities dissolved or suspended therein, and calcining the di-calcium phosphate to remove organic impurities and to convert said di-calcium phosphate to calcium pyro-phosphate.

14. The process of preparing substantially pure water-soluble phosphorus-containing compounds which comprises subjecting an impure phosphatic material to the action of sulphuric acid in such amount and of such strength as to convert the phosphate content of such material substantially completely to mono-calcium phosphate but insufficient to convert more than a minor portion thereof to free phosphoric acid, adding sufficient neutralizing agent to reduce the acidity of the mixture to at least a pH value of 4.4 thereby occasioning the precipitation in an easily separable state of iron, aluminum and fluoride impurities, separating the mono-calcium phosphate in the form of a dilute aqueous solution from the insoluble residues and precipitates, treating said solution with lime to precipitate the phosphate as di-calcium phosphate, separating the di-calcium phosphate so formed from the remaining solution and the impurities dissolved or suspended therein, and subjecting said phosphate to the action of sulphuric acid to convert the $P_2O_5$ content to the water-soluble form.

15. In a process of preparing substantially pure phosphorus-containing compounds from impure phosphatic materials, the steps which comprise subjecting such an impure phosphatic material to the action of sulphuric acid in such amount and of such strength as to convert the phosphate content of such material substantially completely to mono-calcium phosphate in admixture with calcium sulphate but insufficient to convert more than a minor portion thereof to free phosphoric acid, diluting said mixture and adding sufficient neutralizing agent to reduce the acidity of the mixture to at least a pH value of 4.4, thereby occasioning the precipitation in an easily separable state of iron, aluminum and fluoride impurities, separating the mono-calcium phosphate in the form of a dilute aqueous solution from the insoluble residues and precipitates, treating said solution with lime to reduce the acidity thereof to a pH value within the range 5.0–5.4 and to precipitate nearly all of the phosphate as di-calcium phosphate, and separating the di-calcium phosphate from the remaining solution and the impurities dissolved or suspended therein.

16. The process which comprises subjecting di-calcium phosphate containing organic impurities to a calcination treatment to eliminate said impurities and convert said phosphate to calcium pyro-phosphate.

17. In a process of preparing pure water soluble phosphorus-containing compounds from di-calcium phosphate containing organic impurities, the steps which comprise calcining such phosphate to remove organic impurities and to convert such phosphate to calcium pyro-phosphate and treating such calcium pyro-phosphate with sulphuric acid to form ortho-phosphoric acid.

18. In a process of preparing pure water-soluble phosphorus-containing compounds from di-calcium phosphate containing organic impurities, the steps which comprise calcining such phosphate to remove organic impurities and to convert such phosphate to calcium pyro-phosphate and treating such calcium pyro-phosphate with strong sulphuric acid to form relatively concentrated ortho-phosphoric acid.

19. In a process of preparing pure phosphorus-containing compounds from impure water-insoluble phosphatic materials containing a relatively high proportion of impurities such as magnesium and manganese, the steps which comprise treating such a material with sulphuric acid and forming therefrom a dilute solution of mono-calcium phosphate, treating said solution with lime to reduce the acidity thereof to a pH value within the range 5.0–5.4 and to precipitate nearly all of the phosphate as di-calcium phosphate and separating the di-calcium phosphate from the solution and the impurities, such as magnesium and manganese, dissolved or suspended therein.

20. In a process of preparing water soluble phosphorus-containing compounds from impure water insoluble phosphatic materials, the steps which comprise subjecting such an impure phosphatic material to the action of sulphuric acid in such amount and of such strength as to convert the phosphate content of such material substantially completely to mono-calcium phosphate but insufficient to convert more than a minor portion thereof to free phosphoric acid, adding sufficient neutralizing agent to reduce the free phosphoric acid present to less than 1% of the total $P_2O_5$ content of said material thereby occasioning precipitation of iron, aluminum and fluoride impurities, separating the mono-calcium phosphate in the form of a dilute aqueous solution from the insoluble residues and precipitates, treating said solution with lime to form a precipitate of di-calcium phosphate, separating the di-calcium phosphate from the remaining solution and the impurities dissolved or suspended therein, and converting the di-calcium phosphate to ortho-phosphoric acid.

GEORGE F. MOORE.